(12) United States Patent
Shi

(10) Patent No.: US 12,182,985 B2
(45) Date of Patent: Dec. 31, 2024

(54) AUTOMATED ASSESSMENT OF AIRCRAFT STRUCTURE DAMAGE

(71) Applicant: The Boeing Company, Chicago, IL (US)

(72) Inventor: Fong Shi, Clyde Hill, WA (US)

(73) Assignee: The Boeing Company, Chicago, IL (US)

( * ) Notice: Subject to any disclaimer, the term of this patent is extended or adjusted under 35 U.S.C. 154(b) by 540 days.

(21) Appl. No.: 17/536,512

(22) Filed: Nov. 29, 2021

(65) Prior Publication Data

US 2022/0309644 A1    Sep. 29, 2022

Related U.S. Application Data

(60) Provisional application No. 63/165,387, filed on Mar. 24, 2021.

(51) Int. Cl.

| | |
|---|---|
| *G06T 7/00* | (2017.01) |
| *B64F 5/60* | (2017.01) |
| *G05D 1/00* | (2024.01) |
| *G06T 17/00* | (2006.01) |
| *G06T 19/00* | (2011.01) |

(Continued)

(52) U.S. Cl.
CPC ............. *G06T 7/0004* (2013.01); *B64F 5/60* (2017.01); *G05D 1/0094* (2013.01); *G05D 1/0212* (2013.01); *G05D 1/0238* (2013.01); *G05D 1/0242* (2013.01); *G05D 1/0274* (2013.01); *G06T 17/00* (2013.01); *G06T 19/006* (2013.01); *G06V 20/20* (2022.01); *H04N 5/33* (2013.01); *G06T 2207/10016* (2013.01); *G06T 2207/10048* (2013.01); *G06T 2207/30252* (2013.01)

(58) Field of Classification Search
None
See application file for complete search history.

(56) References Cited

U.S. PATENT DOCUMENTS 10,663,292 B2 * 5/2020 Raab ....................... G01S 17/87
2016/0264262 A1 * 9/2016 Colin ..................... B25J 19/023
(Continued)

OTHER PUBLICATIONS

Canadian Intellectual Property Office; Office Action for Application No. 3,153,114 dated Jan. 19, 2024 Jan. 19, 2024.

*Primary Examiner* — Nancy Bitar
(74) *Attorney, Agent, or Firm* — Joseph M. Butscher; The Small Patent Law Group LLC

(57) ABSTRACT

A system may include a camera module that may include a first infrared camera, a second infrared camera, and a visible light camera. The system may further include an autonomous vehicle that may include a vertically extendable arm attached to the camera module. The system may also include a processor configured to initiate movement of the autonomous vehicle around an aircraft according to a predetermined path, initiate a scan of an exterior surface of the aircraft using the first infrared camera, the second infrared camera, the visible light camera, or a combination thereof, determine whether a portion of the exterior surface of the aircraft is damaged based on the scan, and in response to the portion of the exterior surface of the aircraft being damaged, use the first infrared camera, the second infrared camera, and the visible light camera to generate a three-dimensional model of the portion of the exterior surface of the aircraft.

20 Claims, 10 Drawing Sheets

(51) Int. Cl.
*G06V 20/20* (2022.01)
*H04N 5/33* (2023.01)

(56) References Cited

U.S. PATENT DOCUMENTS

| | | | |
|---|---|---|---|
| 2019/0236732 A1* | 8/2019 | Speasl | G05D 1/101 |
| 2020/0096328 A1* | 3/2020 | Raab | G01B 11/2522 |
| 2022/0046228 A1* | 2/2022 | Haskin | H04N 17/002 |
| 2022/0309644 A1* | 9/2022 | Shi | H04N 5/33 |

* cited by examiner

AUTOMATED ASSESSMENT OF AIRCRAFT STRUCTURE DAMAGE

CROSS-REFERENCE TO RELATED APPLICATIONS

This application, under 35 U.S.C. § 119, claims the benefit of U.S. Provisional Patent Application Ser. No. 63/165,387 filed on Mar. 24, 2021, and entitled "Automated Assessment of Aircraft Structure Damage," the contents of which are hereby incorporated by reference herein.

FIELD OF THE DISCLOSURE

This disclosure is generally related to the field of aircraft inspection and, in particular, to automated assessment of aircraft structure damage.

BACKGROUND

Inspection and maintenance may keep an airplane and its components under optimal working conditions, thereby upholding safety standards set by aviation regulatory authorities. As part of an inspection and maintenance routine, an entire aircraft may be examined, maintained, and have parts replaced or repaired. Damage assessment may be part of the flight decision-making processes to ensure flight safety and may be performed during field services, repairs, and ramp inspections of an aircraft, whether it is at a maintenance hangar or parked at an airport terminal gate. Airline ground crews and the flight crew are typically responsible to ensure the aircraft is airworthy before pushback for departures.

Crewmembers typically conduct a ground inspection of parked aircraft at an airport terminal gate. The inspection, known as airport ramp inspection, may involve checks on the aircraft's structure and system components for visible damages. A walk-around or pre-flight visual inspection may be manually conducted during a quick-turnaround at the airport gate. The top of the fuselage, the top of the wings, and the top of the stabilizers may not be inspected until the airplane is placed in layovers. When airport visibility or light conditions are poor, inspection items may be difficult to discern. Further, in order to assess foreign object damage (FOD) caused by hail, birds, lightning, runway debris, etc., resulting in structural damages, a crewmember typically climbs on a ladder and uses measurement tools and gauges to manually obtain dimensions such as width and depth of the damaged areas. The measurements may be manually recorded, along with the crewmember's conclusions, before a decision for departure can be made. This added time and effort may contribute to flight delays, also potential crew injuries. Other disadvantages may exist.

SUMMARY

Disclosed are systems and methods for automated assessment of aircraft structure damage. In an example, a system includes a camera module including a first infrared camera, a second infrared camera, and a visible light camera. The system further includes an autonomous vehicle including a vertically extendable arm, where the camera module is attached to a distal end of the vertically extendable arm. The system also includes a processor configured to initiate movement of the autonomous vehicle around an aircraft according to a predetermined path. The processor is also configured to initiate a scan of an exterior surface of the aircraft using the first infrared camera, the second infrared camera, the visible light camera, or a combination thereof. The processor is further configured to determine whether a portion of the exterior surface of the aircraft is damaged based on the scan, and in response to the portion of the exterior surface of the aircraft being damaged, use the first infrared camera, the second infrared camera, and the visible light camera to compute dimensional parameters of damage to the exterior surface and generate a three-dimensional model of the portion of the exterior surface of the aircraft.

In some examples, the camera module further includes a motorized table configured to rotate in both azimuth and elevation, where the first infrared camera, the second infrared camera, and the visible light camera are attached to the motorized table, and where the first infrared camera and the second infrared camera are separated by a fixed distance relative to one another. In some embodiments, initiating the scan of the exterior surface of the aircraft includes commanding the camera module to scan azimuthally at incremental changes of elevation angles. In some examples, the processor is further configured to plan the movement of the autonomous vehicle around the aircraft using a stored electronic map, and verify the movement of the autonomous vehicle using detectable references positioned on a tarmac, a radar, a lidar, a global positioning system, or a combination thereof. In some examples, the autonomous vehicle is configured to use proximity range sensors to avoid obstacles during the movement of the autonomous vehicle around the aircraft. In some examples, the first infrared camera and the second infrared camera are each capable of infrared illumination using modulated continuous waves, where a modulated continuous wave associated with the first infrared camera is phase shifted to prevent interference with a modulated continuous wave of the second infrared camera, where the first infrared camera and the second infrared camera are each capable of taking independent time-of-flight measurements using the modulated continuous waves, and where the independent time-of-flight measurements are used in generating the three-dimensional model of the portion of the exterior surface. In some examples, the processor is further configured to perform a differential measurement process using visible image data from the visible light camera to remove an ambient background light component from infrared image data received from the first infrared camera and the second infrared camera.

To illustrate the principle of automated assessment of aircraft surface damage, several methods of assessing structural damages such as dents on aircraft exterior are explained throughout this disclosure. In some examples, in response to the portion of the exterior surface of the aircraft being damaged, the processor is further configured to initiate movement of the autonomous vehicle to position the first infrared camera and the second infrared camera so that a base line between the first infrared camera and the second infrared camera is parallel with the portion of the exterior surface of the aircraft. The processor may be configured to rotate the first infrared camera and the second infrared camera so that the first infrared camera and the second infrared camera are iteratively directed at points running along a dent in the portion of the exterior surface of the aircraft beginning at a starting point on a first side of the dent and ending at an ending point on a second side of the dent. For each point of the points running along the dent, the processor may determine a first angle in azimuth associated with the first infrared camera and a second angle in azimuth associated with the second infrared camera. The processor may calculate distances between the base line and the points running along the dent using the first angle in azimuth and the second angle in azimuth for each point of the points, where the distances between the base line and the points running along the dent are used to generate the three-dimensional model of the portion of the exterior surface of the aircraft.

In some examples, in response to the portion of the exterior surface of the aircraft being damaged, the processor is further configured to determine a first distance between the first infrared camera and a starting point of a dent in the portion of the exterior surface of the aircraft using a first time-of-flight measurement. The processor may also determine a second distance between the first infrared camera and an ending point of the dent using a second time-of-flight measurement. The processor may determine an angle in azimuth between a first direction associated with the first infrared camera being directed at the starting point of the dent and a second direction associated with the first infrared camera being directed at the ending point. The processor may further calculate a width between the starting point of the dent and the ending point of the dent based on the first distance, the second distance, and the angle in azimuth. In response to the portion of the exterior surface of the aircraft being damaged, the processor may be configured to use the second infrared camera to confirm the width between the starting point of the dent and the ending point of the dent In response to the portion of the exterior surface of the aircraft being damaged, the processor may be configured to initiate movement of the autonomous vehicle to position the first infrared camera and the second infrared camera so that a base line between the first infrared camera and the second infrared camera is parallel with the portion of the exterior surface of the aircraft. The processor may further determine a first distance between the first infrared camera and a starting point of a dent in the portion of the exterior surface of the aircraft using a first time-of-flight measurement. The processor may also determine a second distance between the first infrared camera and an ending point of the dent using a second time-of-flight measurement. The processor may determine a third distance between the second infrared camera and the starting point of the dent using a third time-of-flight measurement. The processor may further determine a fourth distance between the second infrared camera and the ending point of the dent using a fourth time-of-flight measurement. The processor may calculate a width between the starting point of the dent and the ending point of the dent based on the first distance, the second distance, the third distance, the fourth distance, and a fifth distance between the first infrared camera and the second infrared camera. In some examples, the processor is further configured to produce an augmented reality image or video that superimposes dimensional parameters from the three-dimensional model onto an image or video of the portion of the exterior surface of the aircraft using the three-dimensional model. In some examples, the processor is further configured to enhance visible image data generated by the visible light camera by using a grayscale conversion to remove discrepancies due to lighting conditions.

In some examples, the processor is further configured to provide live imagery or video from the visible light camera to a mobile device via a network connection. In some examples, the processor is further configured to provide the three-dimensional model to a mobile device for rendering via a network connection. In some examples, the system includes a database, where the processor is further configured to provide the three-dimensional model to the database for use in comparisons to future three-dimensional models associated with the portion of the exterior surface, to provide findings related to damage to the exterior surface to the database for documentation, or both. In some embodiments, the processor is configured to provide a damage assessment to a mobile device to assist a crew, an airline, or both in making flight decisions.

In an example, a method includes moving an autonomous vehicle around an aircraft according to a predetermined path, where the autonomous vehicle comprises a vertically extendable arm, where a camera module is attached to a distal end of the vertically extendable arm, and where the camera module comprises a first infrared camera, a second infrared camera, and a visible light camera. The method further includes scanning an exterior surface of the aircraft using the first infrared camera, the second infrared camera, the visible light camera, or a combination thereof. The method also includes determining whether a portion of the exterior surface of the aircraft is damaged based on the scan. The method includes, in response to the portion of the exterior surface of the aircraft being damaged, using the first infrared camera, the second infrared camera, and the visible light camera to generate a three-dimensional model of the portion of the exterior surface of the aircraft.

In some examples, the method may include initiating movement of the autonomous vehicle to position the first infrared camera and the second infrared camera so that a base line between the first infrared camera and the second infrared camera is parallel with the portion of the exterior surface of the aircraft. The method may further include rotating the first infrared camera and the second infrared camera so that the first infrared camera and the second infrared camera are iteratively directed at points running along a dent in the portion of the exterior surface of the aircraft beginning at a starting point on a first side of the dent and ending at an ending point on a second side of the dent. The method may include, for each point of the points running along the dent, determining a first angle in azimuth associated with the first infrared camera and a second angle in azimuth associated with the second infrared camera. The method may include calculating distances between the base line and the points running along the dent using the first angle in azimuth and the second angle in azimuth for each point of the points, wherein the distances between the base line and the points running along the dent are used to generate the three-dimensional model of the portion of the exterior surface of the aircraft.

In some examples, the method includes determining a first distance between the first infrared camera and a starting point of a dent in the portion of the exterior surface of the aircraft using a first time-of-flight measurement. The method may further include determining a second distance between the first infrared camera and an ending point of the dent using a second time-of-flight measurement. The method may include calculating a width between the starting point of the dent and the ending point of the dent based, at least in part, on the first distance and the second distance.

In an example, an apparatus includes a camera module including a first infrared camera, a second infrared camera, and a visible light camera. The apparatus includes an autonomous vehicle including a vertically extendable arm, where the camera module is attached to a distal end of the vertically extendable arm, where the autonomous vehicle is configured to move around an aircraft according to a predetermined path, and where the camera module is configured to scan of an exterior surface of the aircraft using the first infrared camera, the second infrared camera, the visible light camera, or a combination thereof.

In some examples, the autonomous vehicle is further configured to use a stored electronic map, detectable references positioned on a tarmac, a radar, a lidar, a global positioning system, or a combination thereof while moving, and where the autonomous vehicle is further configured to use proximity range sensors to avoid obstacles during movement of the autonomous vehicle around the aircraft.

Figure 1:
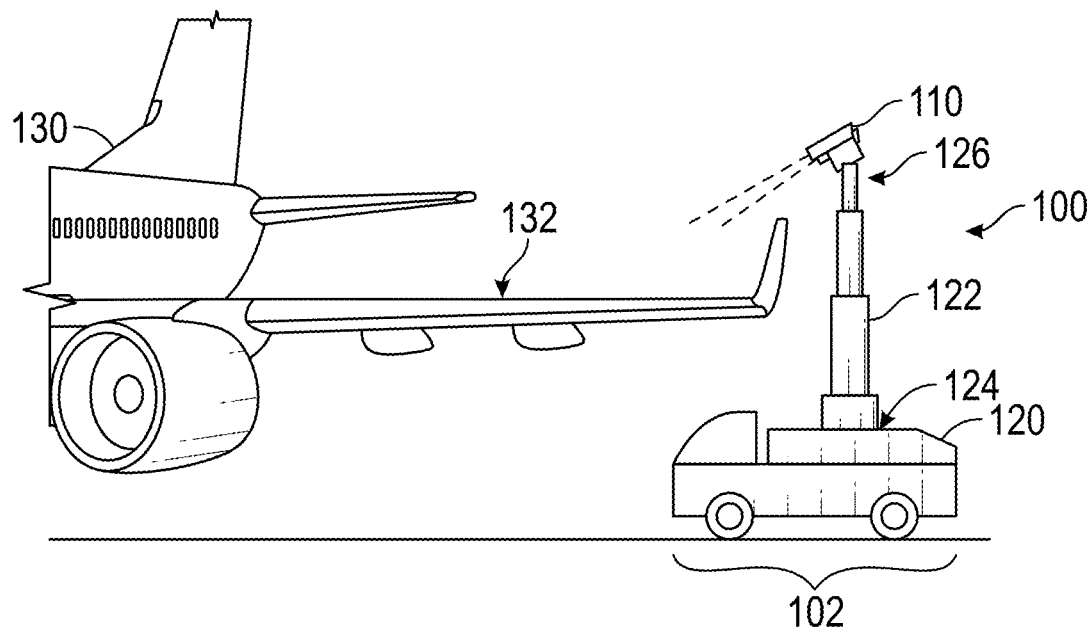
FIG. 1 depicts an example of a system for automated assessment of aircraft structure damage in conjunction with an aircraft.

While the disclosure is susceptible to various modifications and alternative forms, specific examples have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an example of a system 100 for automated assessment of aircraft structure damage is depicted. The system 100 may be used to assess an exterior surface 132 of an aircraft 130. The exterior surface 132 of the aircraft 130 may include any externally visible portion of the aircraft that is capable of being assessed through imagery.

The system 100 may include an apparatus 102 which may include a camera module 110 and an autonomous vehicle 120. The camera module 110 may be configured to capture both visible light and infrared imagery and/or videos. The autonomous vehicle 120 may include a vertically extendable arm 122, which may attach to the autonomous vehicle 120 at a proximal end 124 of the vertically extendable arm 122, and which may attach to the camera module 110 at a distal end 126 of the vertically extendable arm 122.

During operation, the autonomous vehicle 120 may be used to position the camera module 110 to enable inspection of the aircraft 130. For example, the autonomous vehicle 120 may move to a position near the aircraft 130 and the vertically extendable arm 122 may lift the camera module 110 to a height sufficient to view the exterior surface 132 of the aircraft 130.

A benefit of the system 100 is that ground inspections can be performed both above and below the aircraft 130. Further, since drone assisted aircraft inspections are generally prohibited at civil airports, performing a comprehensive surface inspection of the upper part of aircraft 130 may be difficult. However, the vertically extendable arm 122 may overcome this difficulty by enabling aerial views of the aircraft 130 similar to those that a drone may provide. Other benefits may exist as described herein.

Figure 2:
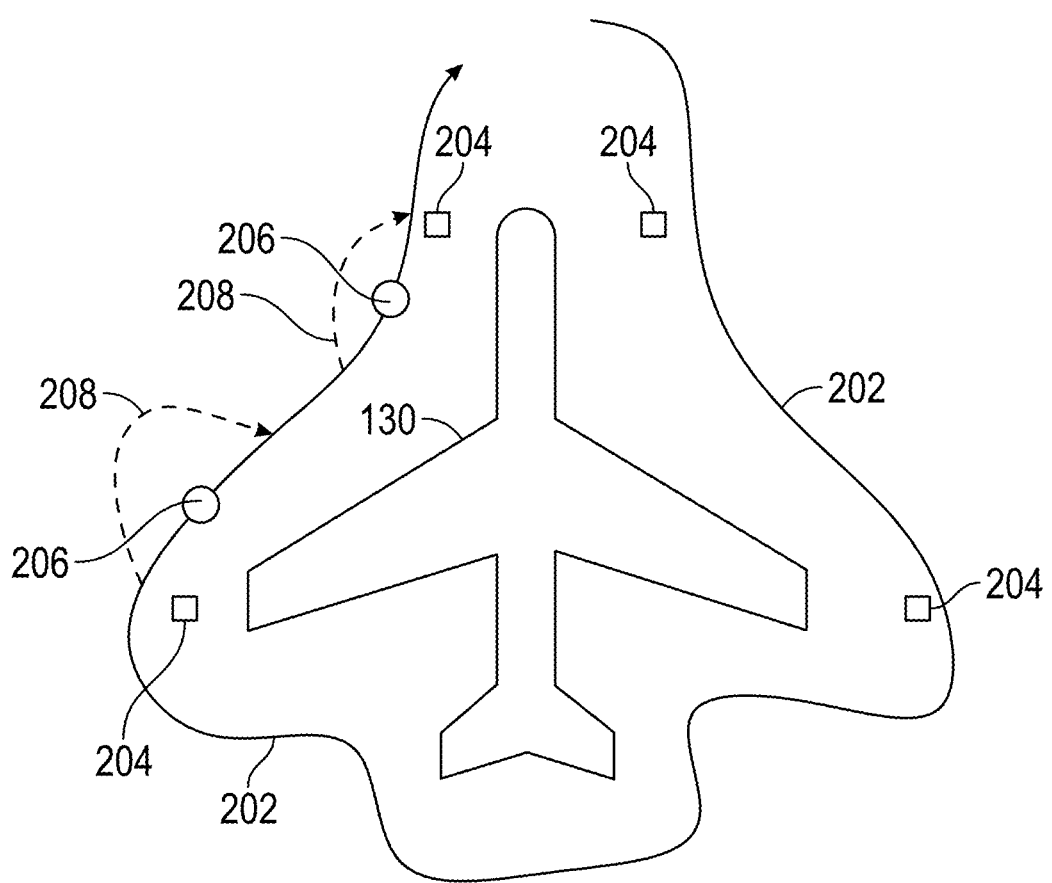
FIG. 2 depicts an example of a predetermined path around an aircraft.

Referring to FIG. 2, an example of a predetermined path 202 is depicted around an aircraft 130. The autonomous vehicle 120, from FIG. 1, may be configured to move around the aircraft 130 according to the predetermined path 202. Detectable references 204 positioned on a tarmac may assist the autonomous vehicle 120 in staying on the predetermined path 202. For example, the autonomous vehicle 120 may include another camera and/or sensor to detect the detectable references 204. In some cases, the camera module 110 may be used to detect the detectable references 204. The detectable references 204 may include dots, strips, reference waypoints, or combinations thereof placed on the tarmac. As an alternative to, or in addition to, the detectable references 204, the autonomous vehicle 120 may be configured to use a stored electronic map, radar, lidar, a global positioning system, or a combination thereof to guide it along the predetermined path 202.

While moving, the autonomous vehicle 120 may be configured to use proximity range sensors to avoid obstacles 206. Examples of obstacles that the autonomous vehicle 120 may encounter include, but are not limited to, ground crew members, ground vehicles, and portions of the aircraft 130. Upon encountering the obstacles 206, the autonomous vehicle 120 may be configured to stop and wait until the obstacles 206 are removed or the autonomous vehicle 120 may be configured to plan and take detour paths 208 to move around the obstacles 206. After following the detour paths 208, the autonomous vehicle 120 may continue along the predetermined path 202.

During the movement along the predetermined path 202, the camera module 110 may be configured to scan the exterior surface 132 of the aircraft 130. The scan may be used, as further described herein, to assess damage to the exterior surface 132, thereby providing a ground crew and a flight crew with sufficient data to make aircraft service and flight decisions.

Figure 3:
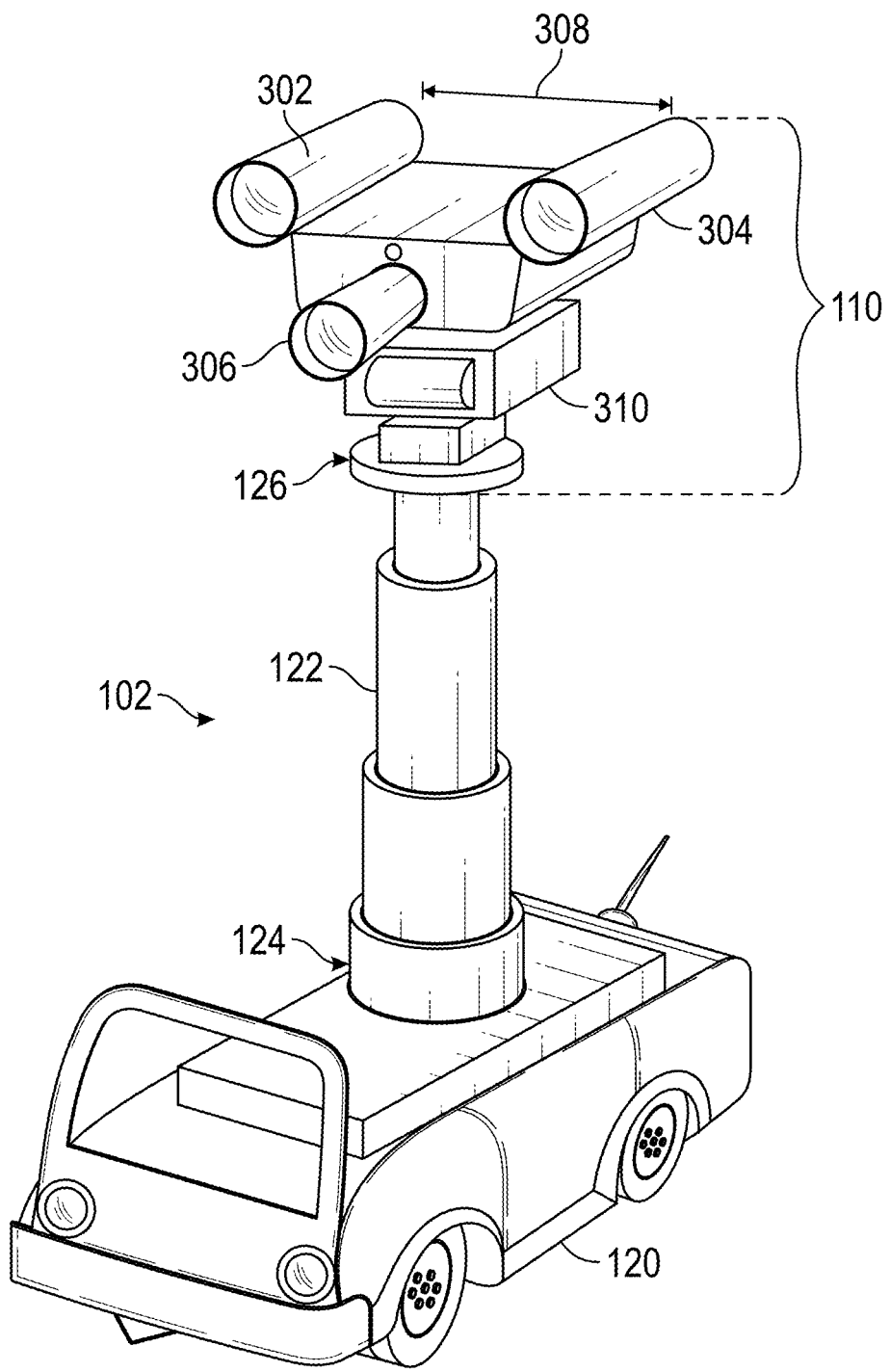
FIG. 3 depicts an example of an apparatus for automated assessment of aircraft structure damage.

Referring to FIG. 3, an example of an apparatus 102 for automated assessment of aircraft structure damage is depicted. The apparatus 102 may include a camera module 110, an automated vehicle 120, and a vertically extendable arm 122. The vertically extendable arm 122 may attach to the automated vehicle 120 at a proximal end 124 of the vertically extendable arm 122 and may attach to the camera module 110 at a distal end 126 of the vertically extendable arm 122. Thus, the vertically extendable arm 122 may raise and lower the camera module 110 as desired.

The camera module 110 may include a first infrared camera 302, a second infrared camera 304, and a visible light camera 306. The first infrared camera 302 and the second infrared camera 304 may each be capable of infrared illumination using modulated continuous waves. Further, the modulated continuous waves associated with the first infrared camera 302 may be phase shifted to prevent interference with the modulated continuous waves associated with the second infrared camera 304. This may enable the first infrared camera and the second infrared camera to capture image data independent of each other. Further, the first infrared camera 302 and the second infrared camera 304 may each be capable of taking independent time-of-flight measurements using the modulated continuous waves having different phase shifts. These time-of-flight measurements may be used in generating a three-dimensional model of damaged portions of an aircraft as described further herein.

The camera module 110 may further include a motorized table 310. The first infrared camera 302, the second infrared camera 304, and the visible light camera 306 may be attached to, or otherwise mounted on, the motorized table 310, such that they may be rotated in both azimuth and elevation by the motorized table 310. The first infrared camera 302 and the second infrared camera 304 may be separated by a fixed distance 308 relative to one another to enable various measurements to be performed as described herein.

Figure 4:
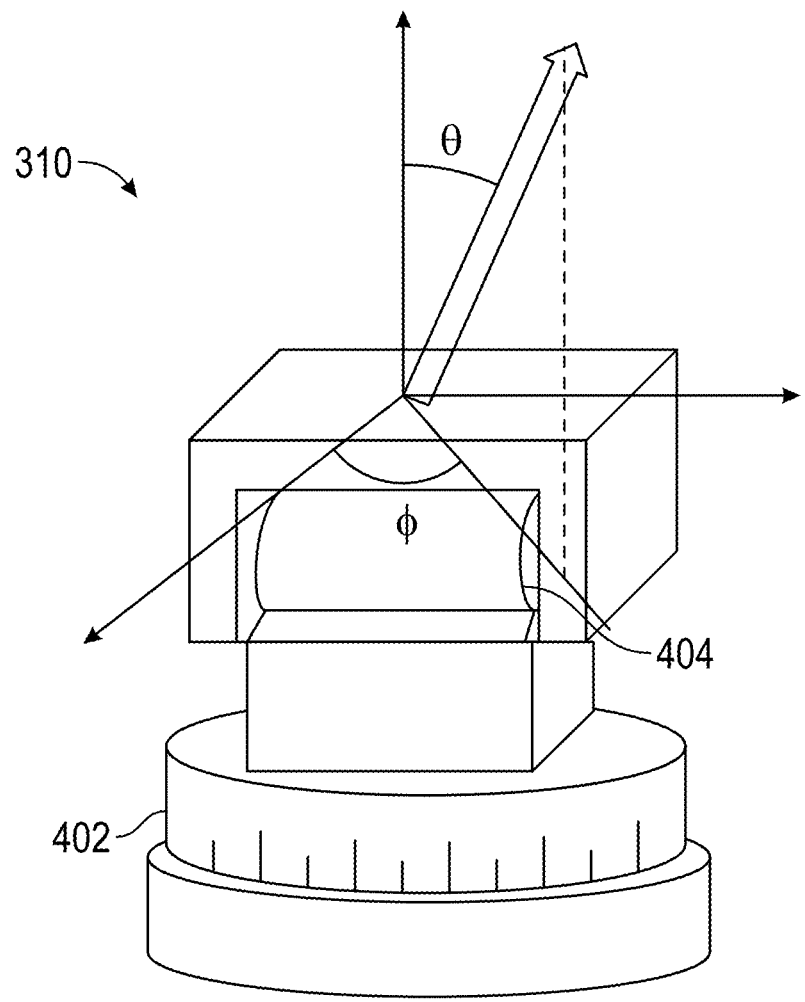
FIG. 4 depicts an example of a motorized table for an example of a system for automated assessment of aircraft structure damage.

Referring to FIG. 4, an example of a motorized table 310 is depicted. The motorized table 310 may include a first rotatable portion 402 to enable rotation in azimuth $\emptyset$ and a second rotatable portion 404 to enable rotation in elevation $\theta$. The motorized table 310 may enable the camera module 110 of FIGS. 1 and 3 to be directed at the exterior surface 132 from multiple directions. Changes of angles in both azimuth $\emptyset$ and elevation $\theta$ of FIG. 4 enables the camera module 110 to scan the exterior surface 132, or any particular area of interest.

Figure 5:
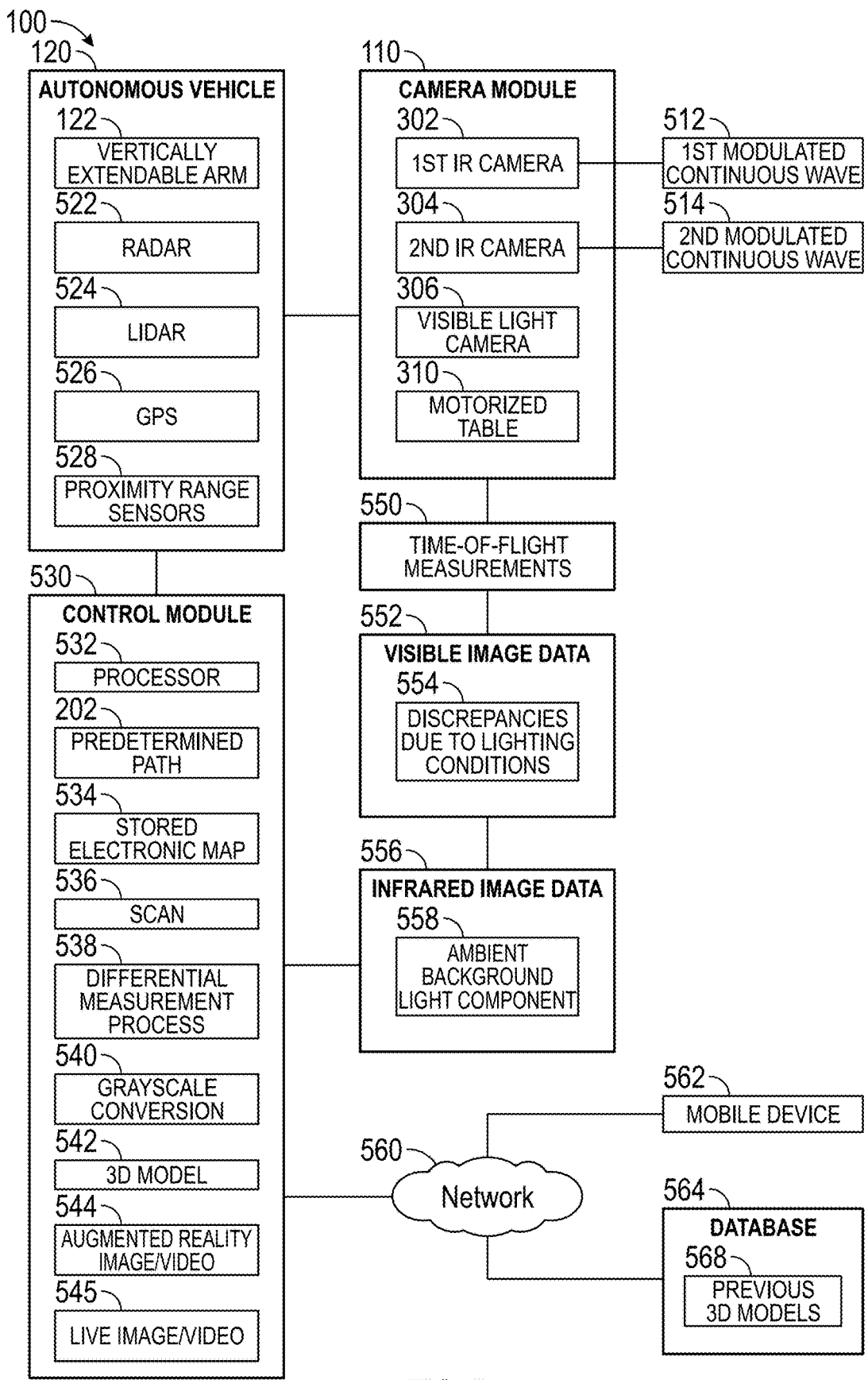
FIG. 5 depicts an example of a system for automated assessment of aircraft structure damage.

Referring to FIG. 5, an example of a system 100 for automated assessment of aircraft structure damage is depicted. As described herein, the system 100 may include a camera module 110 and an autonomous vehicle 120. The camera module 110 may include a first infrared camera 302, a second infrared camera 304, a visible light camera 306, and a motorized table 310. The first infrared camera 302 and the second infrared camera 304 may each be capable of infrared illumination using modulated continuous waves. For example, a first modulated continuous wave 512 associated with the first infrared camera 302 may be phase shifted to prevent interference with a second modulated continuous wave 514 associated with the second infrared camera 304. In that way, the first infrared camera 302 and the second infrared camera 304 may each be capable of taking time-of-flight measurements 550 that are independent of each other.

The autonomous vehicle 120 may include a vertically extendable arm 122 coupled to the camera module 110. The vehicle 120 may further include a radar 522, a lidar 524, a global positioning system 526, and/or combinations thereof to assist the vehicle 120 in following the predetermined path 202 of FIG. 2. The autonomous vehicle 120 may also include proximity range sensors 528 to assist the vehicle 120 with avoiding the obstacles 206 of FIG. 2.

The system 100 may include a control module 530 for controlling the autonomous vehicle 120 and for processing data as described herein. The control module 530 may be part of the autonomous vehicle 120, or it may be separate from the autonomous vehicle 120 and may perform control functions remotely. In some cases, the control module 530 may be distributed between the autonomous vehicle 120 and one or more remote devices.

The control module 530 may include a processor 532. As used herein, the processor 532 may include a microcontroller, a central processing unit (CPU), a graphical processing unit (GPU), a digital signal processor (DSP), a peripheral interface controller (PIC), another type of microprocessor, and/or combinations thereof. Further, the processor 532 may be implemented as an integrated circuit, a complementary metal-oxide-semiconductor (CMOS) metal-oxide-semiconductor field-effect-transistor (MOSFET) circuit, a very-large-scale-integrated (VLSI) circuit, a field-programmable gate array (FPGA), an application-specific integrated circuit (ASIC), a combination of logic gate circuitry, another type of digital or analog electrical design component, or combinations thereof. For purposes of this disclosure, the processor 532 may further comprise memory sufficient to perform the functions described herein. The memory may include memory devices such as random-access memory (RAM), read-only memory (ROM), magnetic disk memory, optical disk memory, flash memory, another type of memory capable of storing data and processor instructions, or the like, or combinations thereof.

The system 100 may include a mobile device 562 and a database 564 coupled to the control module 530 via a network connection 560. The mobile device 562 may be, but is not limited to, a laptop device, a tablet device, an electronic flight book, or another type of personal computing device. The mobile device 562 may be associated with a ground crew member, a flight crew member, or another member of a group charged with assessing an aircraft.

During operation, the processor 532 may initiate movement of the autonomous vehicle 120 around an aircraft (e.g., the aircraft 130) according to a predetermined path 202. Before initiating the movement, the processor 532 may plan the movement of the autonomous vehicle 120 using a stored electronic map 534. As the autonomous vehicle 120 moves, the processor 532 may verify the movement of the autonomous vehicle 120 using detectable references (e.g., the detectable references 204) positioned on a tarmac. The movement may also be verified through the use of the radar 522, the lidar 524, the global positioning system 526, or a combination thereof. Further, the processor 532 may receive input from the proximity range sensors 528 to avoid obstacles (e.g., the obstacles 206) during the movement of the autonomous vehicle 120 around the aircraft 130.

While the autonomous vehicle 120 moves around the aircraft 130, the processor 532 may initiate a scan 536 of an exterior surface 132 of the aircraft 130 using the first infrared camera 302, the second infrared camera 304, the visible light camera 306, or a combination thereof. In some cases, the scan 536 may be made using the visible light camera 306 and the processor 532 may rely on visual image processing techniques to analyze the scan 536. In this way, the processor 532 may determine whether a portion of the exterior surface 132 of the aircraft 130 is damaged.

In response to determining that damage exists, the control module 530 may receive the time-of-flight measurements 550, visible image data 552, and infrared image data 556 from the camera module 110. The processor 532 may use the time-of-flight measurements 550 to generate a three-dimensional model 542 of the damage. The processor 532 may also generate an augmented reality image or video 544 based on the three-dimensional model 542, the visible image data 552, the infrared image data 556, or combinations thereof.

The augmented reality image or video 544 may be used to aid crews in making flight decisions.

Various processes may be applied to the visible image data 552 and the infrared image data 556 to improve its usefulness for flight and ground crews. For example, the visible image data 552 may initially include discrepancies due to lighting conditions 554. The processor 532 may enhance the visible image data 552 generated by the visible light camera 306 by using a grayscale conversion 540 to remove the discrepancies due to lighting conditions 554. As another example, the infrared image data 556 may include an ambient background light component 558. The processor 532 may perform a differential measurement process 538 using the visible image data 552 from the visible light camera 306 to remove the ambient background light component 558. The differential measurement process 538 may differentiate the visible image data 552 taken by the visible light camera 306 and the infrared image data 556 and reveal infrared-only content. The resulting content is without the effects of the ambient background light component 558 which may contribute to errors such as bias, shift, and offset. Based on measured pixel intensity, phase angles between illumination and reflection and a distance between the imaging sensor and an object can be calculated.

The control module 530 may be configured to provide a live image or video 545 from the visible light camera 306 to a mobile device 562 via a network connection 560. This may enable a flight crew or a ground crew to view the scan 536 in real time. Further, the control module 530 may be configured to provide the three-dimensional model 542 to the mobile device 562 for rendering via the network connection 560. The three-dimensional model 542 may be superimposed with the augmented reality image or video 544. The control module 530 may provide the three-dimensional model 542 to the database 564. The database 564 may store previous three-dimensional models 568 to use for comparison. Thus, the three-dimensional model 542 may be stored for use in comparisons to future three-dimensional models. The control module 530 may further provide a damage assessment to the mobile device 562 to assist a crew, an airline, or both in making flight decisions.

A benefit of the system 100 is that aircraft inspections may be automated and efficiency of flight crews and ground crews in making damage assessments can be increased. Additionally, by maintaining the database 564, more data for analytics may be generated. Other benefits may exist.

Figure 6:
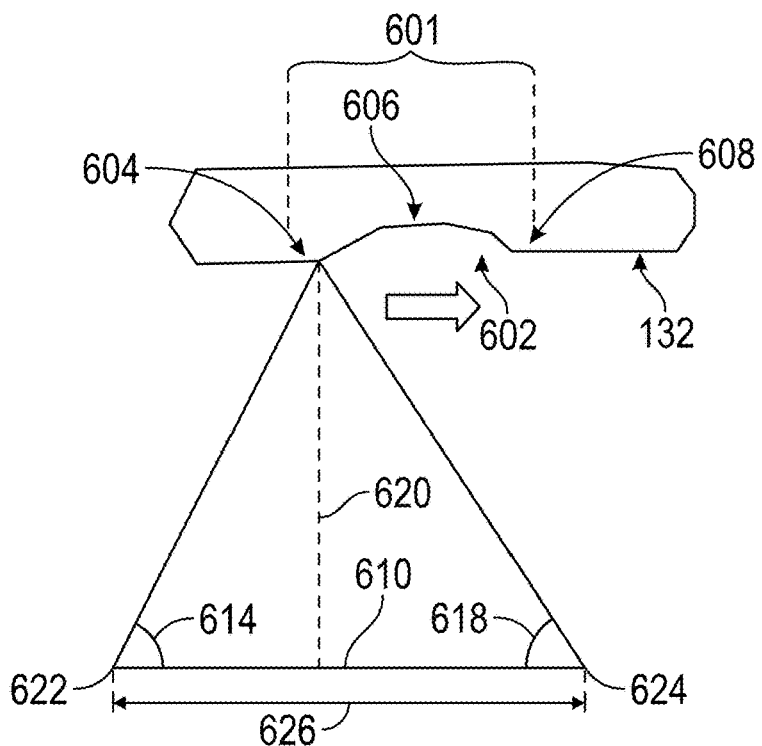
FIG. 6 depicts an example of a first set of measurements taken over an exterior surface for determining a depth of a dent.

Referring to FIG. 6, an example of a first set of measurements taken over an exterior surface 132 for determining a depth of a dent 602 is depicted. The measurements depicted may be taken in response to a determination that a portion 601 of the exterior surface 132 (e.g., of the aircraft 130) is damaged.

In order to determine the depth and/or shape of the dent 602, a base line 610 between a first point 622 (which may be associated with the first infrared camera 302 of FIGS. 3 and 5) and a second point 624 (which may be associated with the second infrared camera 304 of FIGS. 3 and 5) may be made parallel with the portion 601 of the exterior surface 132. In order to position the base line 610 in a parallel configuration, the autonomous vehicle 120 of FIGS. 1, 3, and 5 may be moved. In particular, the processor 532 may initiate movement of the autonomous vehicle 120.

The first infrared camera 302 and the second infrared camera 304 camera may be rotated so that the first infrared camera 302 and the second infrared camera 304 are directed to a starting point 604 of the dent 602. As shown in FIG. 6, a first angle of azimuth 614 may be determined at the first point 622 based on an angle of rotation of the first infrared camera 302. A second angle of azimuth 618 may be determined at the second point 624 based on an angle of rotation of the second infrared camera 304. A distance 626 between the first point 622 and the second point 624 may be fixed. A distance 620 between the base line 610 and the starting point 604 may be determined based on the following formula:

$$h = \frac{d}{(\tan\alpha)^{-1} + (\tan\beta)^{-1}}$$

where h is the distance 620 between the base line 610 and the point 604, d is the distance 626 between the first point 622 and the second point 624 (e.g., between the first infrared camera 302 and the second infrared camera 304), $\alpha$ is the first angle in azimuth 614, and $\beta$ is the second angle in azimuth 618. Since the distance 626 between the two infrared cameras is known, the process may be iteratively repeated for multiple points, such as at least one intermediate point 606, up to an ending point 608. The process may be repeated along a full plane associated with the exterior surface 132 to map out depths and shape of the dent 602.

Figure 7:
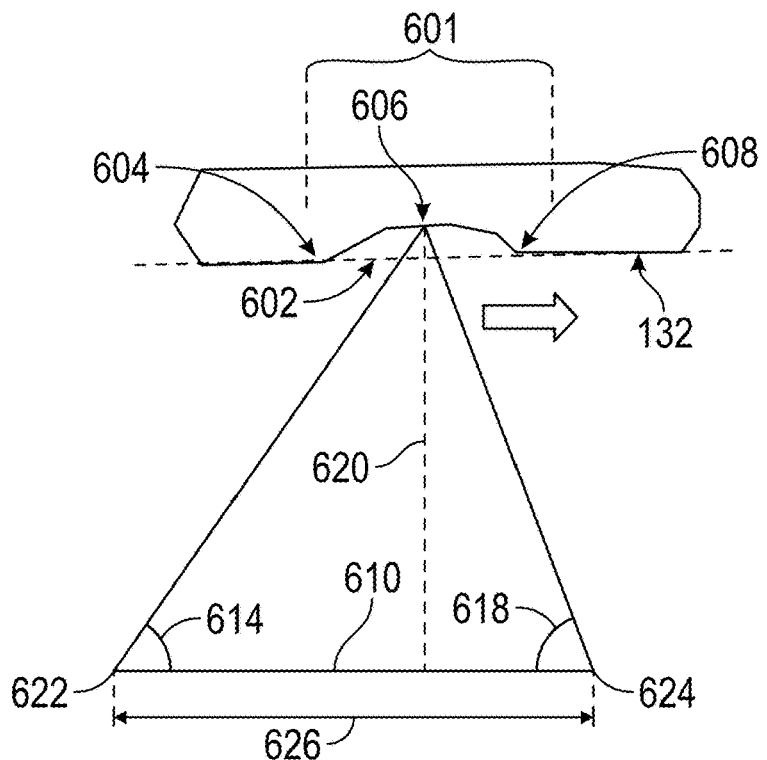
FIG. 7 depicts an example of a second set of measurements taken over an exterior surface determining a depth of a dent.

Referring to FIG. 7, an example of a second set of measurements taken over the portion 601 of the exterior surface 132 for determining a depth of the dent 602 is depicted. In FIG. 7, the first infrared camera 302 and the second infrared camera 304 may be rotated so that the first infrared camera 302 and the second infrared camera 304 are directed to the intermediate point 606. In this state, the first angle in azimuth 614 at the first point 622 has been reduced relative to FIG. 6 and the second angle in azimuth 618 at the second point 624 has been increased relative to FIG. 6. Because the intermediate point 606 is deeper within the portion 601 of the exterior surface 132, a distance 620 between the base line 610 and the intermediate point 606 may be increased relative to FIG. 6. The distance 620 may be determined as described with reference to FIG. 6 based on the first angle in azimuth 614, the second angle in azimuth 618, and the fixed distance 626 between the first point 622 and the second point 624.

As described with respect to FIGS. 6 and 7, for each point (e.g., the starting point 604, the intermediate point 606, and the ending point 608) of a set of points running along the dent 602, a first angle in azimuth 614 associated with the first infrared camera 302 and a second angle in azimuth 618 associated with the second infrared camera 304 may be determined. Distances between the base line 610 and the points running along the dent 602 may be calculated using the first angle in azimuth 614 and the second angle in azimuth 618 for each point. This process may be repeated for incremental changes of elevation angle θ of FIG. 4 to scan the entire area of the dent 602. Distances (e.g., the distance 620) between the base line 610 and the points may be used to generate the three-dimensional model 542 mapping out the depth and shape of the dent 602.

Figure 8:
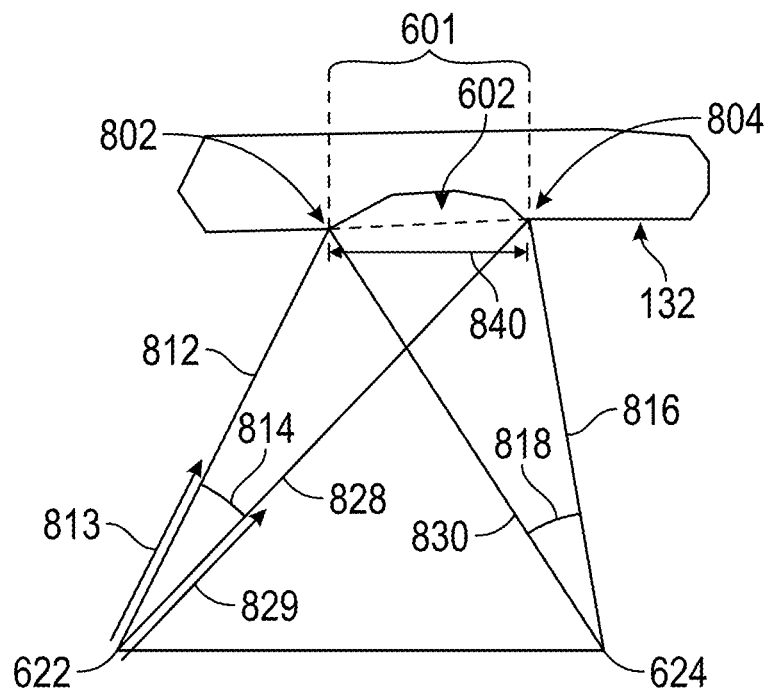
FIG. 8 depicts an example of a first set of measurements taken over an exterior surface for determining a width of a dent.
Figure 9:
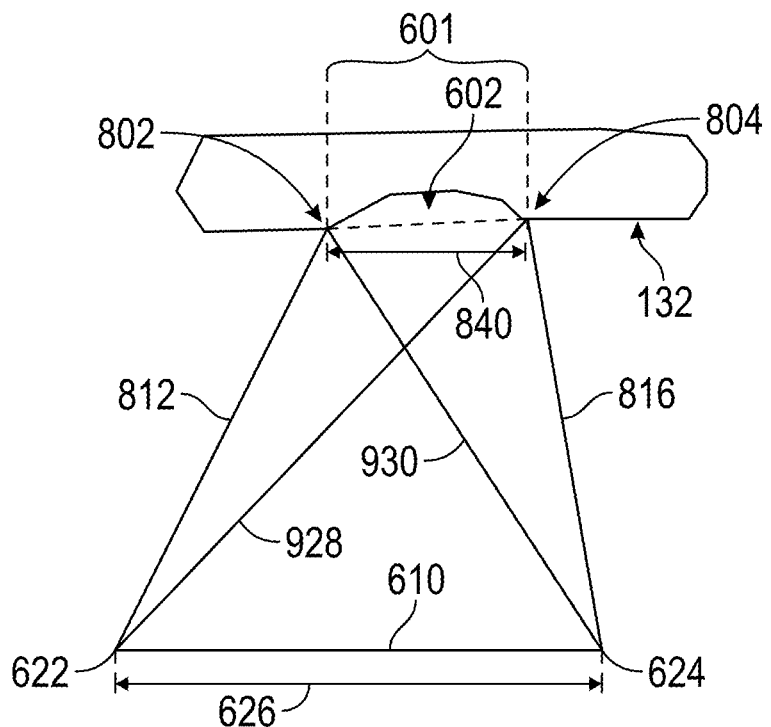
FIG. 9 depicts an example of a second set of measurements taken over an exterior surface for determining a width of a dent.

Referring to FIG. 8, an example of a first set of measurements taken over a portion 601 of an exterior surface 132 for determining a width 840 of a dent 602 is depicted. The width 840 can be determined using multiple different measurements, one of which is depicted in FIG. 8 and another of which is depicted in FIG. 9.

In FIG. 8, a first time-of-flight measurement may be used to determine a first distance 812 between the first point 622 associated with the first infrared camera 302 and a starting point 802 of the dent 602. A second distance 828 between the first point 622 and an ending point 804 of the dent 602 may be determined using a second time-of-flight measurement. An angle in azimuth 814 between a first direction 813 associated with the first infrared camera 302 being directed at the starting point 802 of the dent 602 and a second direction 829 associated with the first infrared camera 302 being directed at the ending point 804 may be determined. The width 840 may be trigonometrically calculated through the law of cosines based on the first distance 812, the second distance 828, and the angle of azimuth 814. In other words, $$w = \sqrt{a^2 + b^2 - 2 \times a \times b \times \cos\gamma}$$

where w is the width 840 between the starting point 802 and the ending point 804, a is the distance 812 between the first point 622 and the starting point 802; b is the distance 828 between the first point 622 and the ending point 804, and γ is the angle of azimuth 814.

The second infrared camera 304 associated with the second point 624 may be used to confirm the width 840. For example, the width 840 may be trigonometrically verified based on a third distance 830 between the second point 624 and the starting point 802, a fourth distance 816 between the second point 624 and the ending point 804, and another angle in azimuth 818 associated with the second point 624.

Referring to FIG. 9, an example of a second set of measurements taken over the portion 601 of the exterior surface 132 for determining the width 840 of the dent 602 is depicted. In the case of FIG. 9, the process may be performed after movement of the autonomous vehicle 120 to position the first infrared camera 302 and the second infrared camera 304 so that a base line 610 between the first infrared camera 302 and the second infrared camera 304 is parallel with the portion 601 of the exterior surface 132.

In FIG. 9, a first distance 812 between the first point 622 associated with the first infrared camera 302 and a starting point 802 of the dent 602 may be determined using a first time-of-flight measurement. A second distance 928 between the first point 622 and an ending point 804 of the dent 602 may be determined using a second time-of-flight measurement. A third distance 930 between the second point 624 and the starting point 802 may be determined using a third time-of-flight measurement. A fourth distance 816 between the second point 624 and the ending point 804 may be determined using a fourth time-of-flight measurement. Under this condition that the camera module 110 is in parallel with the portion 601, a quadrilateral based on the distances 812, 816, 928, 930 can be treated as a cyclic type. Based on the principle of Ptolemy Inequality of a quadrilateral, the width 840 of the dent 602 may be determined in an alternative method that is based solely on distance measurements, without azimuth angle involved.

$$w = \frac{c \times g - a \times e}{f}$$

where w is the same width 840 between the starting point 802 and the ending point 804; a is the same distance 812 between the first point 622 and the starting point 802; c is the distance 928 between the first point 622 and the ending point 804; g is the distance 930 between the second point 624 and the starting point 802; e is the distance 816 between the second point 624 and the ending point 804; f is the distance 626 between the first point 622 and the second point 624, i.e., the separation between two infrared cameras on camera module 110.

By scanning the camera module 110 azimuthally at every incremental change of the elevation angles in FIG. 4, depths and widths of the dent 602 are determined, and a three-dimensional model 542 of FIG. 5 may be generated. Further, the augmented reality image or video 544 may be generated based on the three-dimensional model 542.

Figure 10:
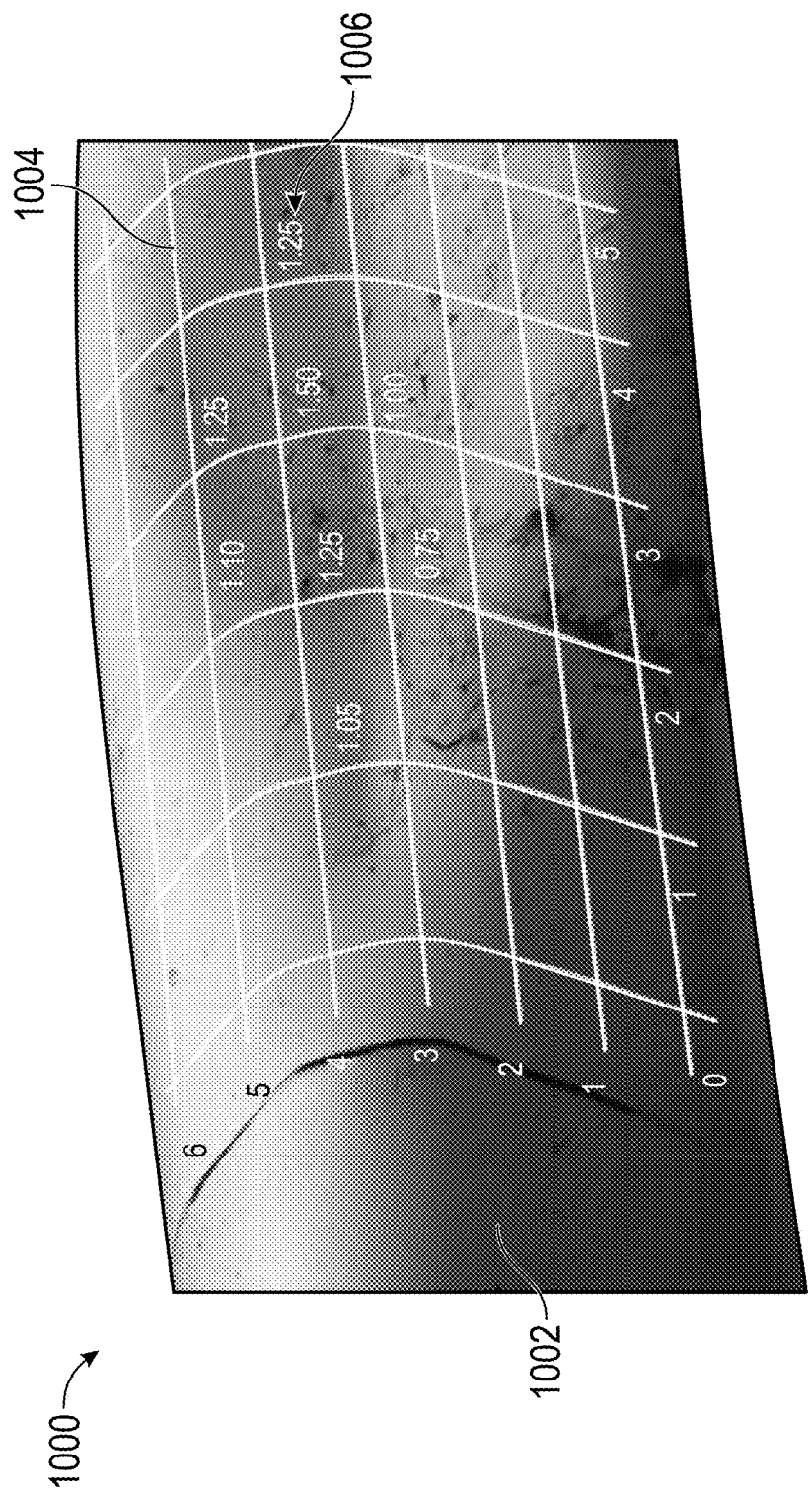
FIG. 10 depicts an example of an augmented reality image of a surface.

Referring to FIG. 10, an example of an augmented reality image or video 1000 is depicted. The augmented image or video 1000 may include a visible image or video 1002 superimposed with a mesh or a grid 1004 representing damage information. For example, as depicted in FIG. 10, depth numbers 1006 may be present along the grid 1004 to indicate the contour and/or shape of damage depicted in the image or video 1002. The augmented reality image or video 1000 may enable a flight crew member or a ground crew member to make an accurate assessment of the effect the damage may have on a flight. Additional flight decisions may then be made accordingly.

Figure 11:
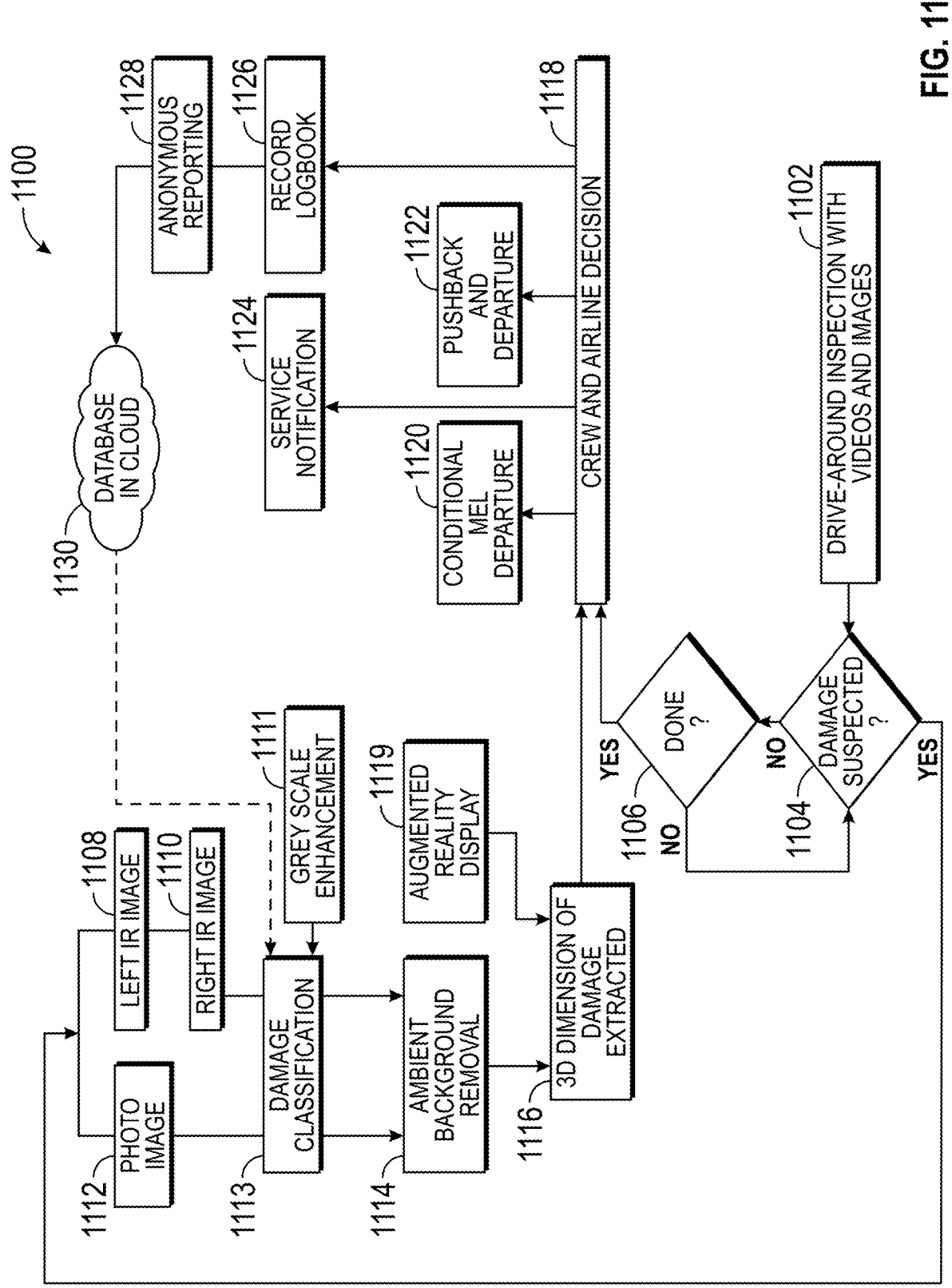
FIG. 11 is an operation flow chart for automated aircraft inspection during gate turnaround at airport.

Referring to FIG. 11, an example of a method 1100 for automated assessment of aircraft structure damage is depicted. The method 1100 may include performing a drive-around inspection with videos and images, at 1102. For example, the autonomous vehicle 120 may be configured to follow the predetermined path 202 while the camera module 110 generates photos and videos. Then, a determination as to whether damage is suspected may be made at 1104.

If no damage is suspected at 1104, then the method 1100 may continue with the drive-around inspection, at 1102, until the inspection is done at 1106. If the inspection is done, then the results may be submitted to a crew and airline for making a flight decision, at 1118. If damage is suspected, at 1104, then images may be obtained, as described herein. A photo image 1112 may be obtained, for example, by using the visible light camera 306 of FIGS. 3 and 5. A left infrared image may be taken at 1108 and a right infrared image may be taken at 1110. The first infrared camera 302 and the second infrared camera 304 may be used. Based on the images, damage classification may be performed, at 1113. In order to classify the damage, previously generated data (such as previous models, images, videos, etc.) may be retrieved from a database 1130 which may be cloud-based. Further, grayscale enhancement may be performed at 1111 to enable comparison between the photo image taken at 1112 and data from the database 1130. For example, the grayscale enhancement performed at 1111 may compensate for lighting under differing lighting conditions.

After the damage has been classified at 1113, an ambient background removal process may be performed at 1114. The ambient background removal process may remove a visible light component from the infrared images taken at 1108, 1110. Once the ambient background removal has taken place at 1114, three-dimensional dimensions, such as depths and widths, of the damage may be extracted, at 1116. An augmented reality display may be generated at 1119 and combined with dimensions that were extracted at 1116. At 1118, the crew and airline decision may be made based on the augmented reality display. Examples of decisions that may be made include a conditional minimal equipment list (MEL) departure, at 1120, a service notification at 1124, or pushback and departure at 1122. This list is non-exhaustive and other decisions may be made by the crew and airline based on existing flight standards. A record may be entered into a logbook, at 1126, noting the damage and the decision made at 1118. Further, reporting of damages and findings considered confidential to airlines may be made anonymously at 1128. These items may be stored in the database 1130 for later use.

As shown in FIG. 11, the system 100 and its associated processes may be incorporated into existing decision-making processes used by flight crews and ground crews to assist decision makers in their assignments. The automated process may ensure a more thorough inspection and better decision outcomes. Other benefits may exist.

Figure 12:
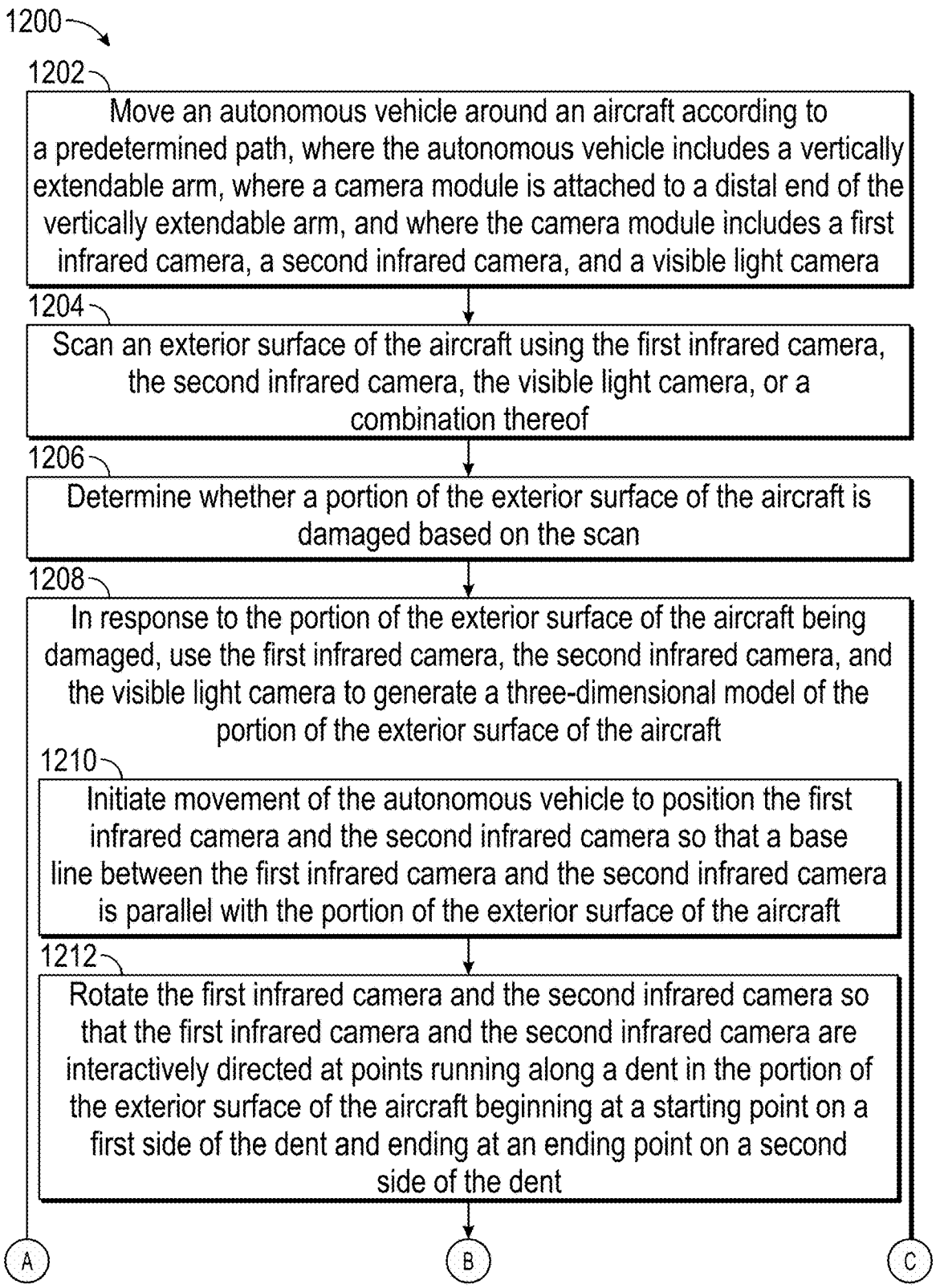
FIG. 12 is an inspection flow chart depicting an example of a method for automated assessment of aircraft structure damage.
Figure 12:
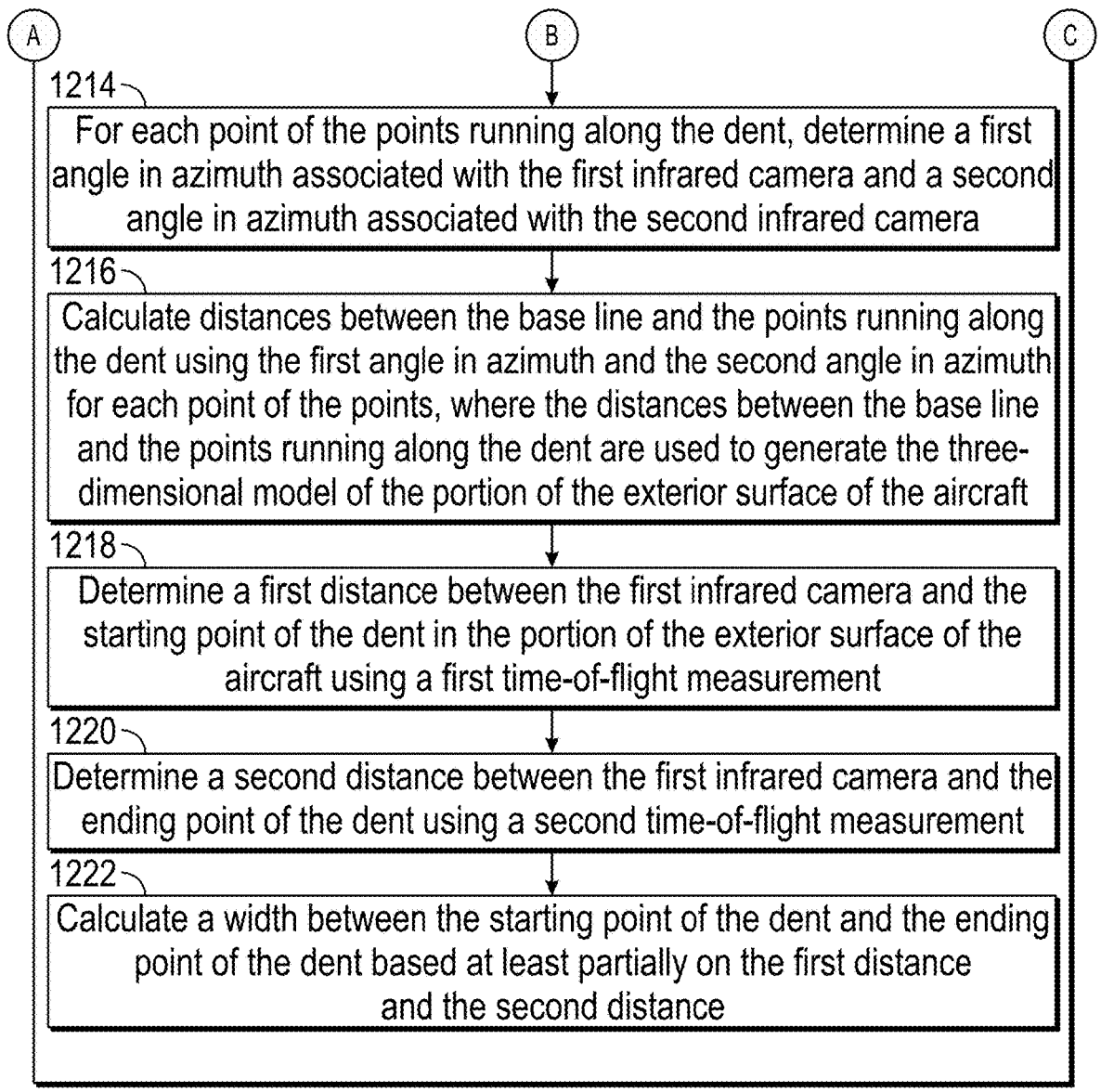

Referring to FIG. 12, an example of a method 1200 for making aircraft service decisions and incorporating automated assessment of aircraft structure damage is depicted. The method 1200 may include moving an autonomous vehicle around an aircraft according to a predetermined path, where the autonomous vehicle includes a vertically extendable arm, where a camera module is attached to a distal end of the vertically extendable arm, and where the camera module includes a first infrared camera, a second infrared camera, and a visible light camera, at 1202. For example, the autonomous vehicle 120 may move around the aircraft 130 according to the predetermined path 202.

The method 1200 may further include scanning an exterior surface of the aircraft using the first infrared camera, the second infrared camera, the visible light camera, or a combination thereof, at 1204. For example, the exterior surface 132 may be scanned using the first infrared camera 302, the second infrared camera 304, the visible light camera 306, or a combination thereof as the autonomous vehicle 120 moves around the aircraft 130.

The method 1200 may also include determining whether a portion of the exterior surface of the aircraft is damaged based on the scan, at 1206. For example, the processor 532 may determine whether the portion 601 of the exterior surface 132 of the aircraft 130 is damaged based on the scan 536, which may be taken while the autonomous vehicle 120 moves.

The method 1200 may also include, in response to the portion of the exterior surface of the aircraft being damaged, using the first infrared camera, the second infrared camera, and the visible light camera to generate a three-dimensional model of the portion of the exterior surface of the aircraft, at 1208. For example, the first infrared camera 302, the second infrared camera 304, and the visible light camera 306 may be used to generate the three-dimensional model 542 of the damage.

The method 1200 may include additional sub-processes for generating the three-dimensional model. For example, the method 1200 may include initiating movement of the autonomous vehicle to position the first infrared camera and the second infrared camera so that a base line between the first infrared camera and the second infrared camera is parallel with the portion of the exterior surface of the aircraft, at 1210. For example, the autonomous vehicle 120 may be positioned such that the base line 610 between the first point 622 (associated with the first infrared camera 302) and the second point 624 (associated with the second infrared camera 304) is parallel with the portion 601 of the exterior surface 132 of the aircraft 130.

The method 1200 may further include rotating the first infrared camera and the second infrared camera so that the first infrared camera and the second infrared camera are iteratively directed at points running along a dent in the portion of the exterior surface of the aircraft beginning at a starting point on a first side of the dent and ending at an ending point on a second side of the dent, at 1212. For example, the first infrared camera 302 and the second infrared camera 304 may be iteratively directed at the starting point 604, the intermediate point 606, and the ending point 608. Additional intermediate points may also exist.

The method 1200 may also include, for each point of the points running along the dent, determining a first angle in azimuth associated with the first infrared camera and a second angle in azimuth associated with the second infrared camera, at 1214. For example, the first angle in azimuth 614 and the second angle in azimuth 618 may be determined.

The method 1200 may include calculating distances between the base line and the points running along the dent using the first angle in azimuth and the second angle in azimuth for each point of the points, where the distances between the base line and the points running along the dent are used to generate the three-dimensional model of the portion of the exterior surface of the aircraft, at 1216. For example, based on the first angle in azimuth 614 and the second angle in azimuth 618, the distance 620 between the base line 610 and the points 604, 606, and 608 may be determined. Other factors may also be included in the calculation, such as the distance 626 between the first point 622 and the second point 624.

The method 1200 may include determining a first distance between the first infrared camera and the starting point of the dent in the portion of the exterior surface of the aircraft using a first time-of-flight measurement, at 1218. For example, the first infrared camera 302 may use a time-of-flight measurement to determine a distance 812 between the first point 622 and the starting point 802.

The method 1200 may further include determining a second distance between the first infrared camera and the ending point of the dent using a second time-of-flight measurement, at 1220. For example, the first infrared camera 302 may use a time-of-flight measurement to determine a distance 828 between the first point 622 and the ending point 804.

The method 1200 may include calculating a width between the starting point of the dent and the ending point of the dent based at least partially on the first distance and the second distance, at 1222. For an example of FIG. 8, the distance 812 between the first point 622 and the starting point 802 and the distance 828 between the first point 622 and the ending point 804 may be used, among other parameters, to determine the width 840 of the dent 602. In some cases, the other parameters may include the first angle in azimuth 814. In some cases, the other calculated parameters may include the distance 816 of either FIG. 8 or 9 between the second point 624 and the ending point 804, the distance 830 in FIG. 8 or the distance 930 in FIG. 9 between the second point 624 and the starting point 802, and the distance 626 in FIG. 9 between the first point 622 and the second point 624.

An advantage of the method 1200 is that by scanning camera module 110 azimuthally at incremental change of the elevation angles in FIG. 4, with the help of computational algorithms and augmented reality, a three-dimensional model may be generated to enable a ground crew and/or flight crew to efficiently and effectively inspect an aircraft and make flight decisions based on the inspection. Other advantages may exist.

Although various examples have been shown and described, the present disclosure is not so limited and will be understood to include all such modifications and variations as would be apparent to one skilled in the art.

What is claimed is:

1. An automated system comprising:
 a camera module comprising:
  a first infrared camera;
  a second infrared camera; and
  a visible light camera;

an autonomous vehicle comprising a vertically extendable arm, wherein the camera module is attached to a distal end of the vertically extendable arm; and a processor configured to:
  initiate first movement of the autonomous vehicle around an aircraft according to a predetermined path;
  initiate a scan of an exterior surface of the aircraft using the first infrared camera, the second infrared camera, the visible light camera, or a combination thereof;
  in response to a portion of the exterior surface of the aircraft being damaged, initiate second movement of the autonomous vehicle to position the first infrared camera and the second infrared camera so that a base line between the first infrared camera and the second infrared camera is parallel with the portion of the exterior surface of the aircraft;
  determine a first distance between the first infrared camera and a starting point of a dent in the portion of the exterior surface of the aircraft using a first time-of-flight measurement;
  determine a second distance between the first infrared camera and an ending point of the dent using a second time-of-flight measurement;
  determine an angle in azimuth between a first direction associated with the first infrared camera being directed at the starting point of the dent and a second direction associated with the first infrared camera being directed at the ending point;
  calculate a width between the starting point of the dent and the ending point of the dent based on the first distance, the second distance, and the angle in azimuth; and
  generate a three-dimensional model of the portion of the exterior surface of the aircraft based at least partially on the width.

2. The automated system of claim 1, wherein the camera module further comprises a motorized table configured to rotate in both azimuth and elevation, wherein the first infrared camera, the second infrared camera, and the visible light camera are attached to the motorized table, wherein the first infrared camera and the second infrared camera are separated by a fixed distance relative to one another, and wherein initiating the scan of the exterior surface of the aircraft comprises commanding the camera module to scan azimuthally at incremental changes of elevation angles.

3. The automated system of claim 1, wherein the processor is further configured to:
  plan the first movement of the autonomous vehicle around the aircraft using a stored electronic map; and
  verify the first movement of the autonomous vehicle using detectable references positioned on a tarmac, a radar, a lidar, a global positioning system, or a combination thereof.

4. The automated system of claim 1, wherein the autonomous vehicle is configured to use proximity range sensors to avoid obstacles during the first movement of the autonomous vehicle around the aircraft.

5. The automated system of claim 1, wherein the first infrared camera and the second infrared camera are each capable of infrared illumination using modulated continuous waves, wherein a modulated continuous wave associated with the first infrared camera is phase shifted to prevent interference with a modulated continuous wave associated with the second infrared camera, wherein the first infrared camera and the second infrared camera are each capable of taking independent time-of-flight measurements using the modulated continuous waves, and wherein the independent time-of-flight measurements are used in generating the three-dimensional model of the portion of the exterior surface.

6. The automated system of claim 1, wherein the processor is further configured to perform a differential measurement process using visible image data from the visible light camera to remove an ambient background light component from infrared image data received from the first infrared camera and the second infrared camera.

7. The automated system of claim 1, wherein, in response to the portion of the exterior surface of the aircraft being damaged, the processor is further configured to use the second infrared camera to confirm the width between the starting point of the dent and the ending point of the dent.

8. The automated system of claim 1, wherein, in response to the portion of the exterior surface of the aircraft being damaged, the processor is further configured to:
  determine a third distance between the second infrared camera and the starting point of the dent using a third time-of-flight measurement; and
  determine a fourth distance between the second infrared camera and the ending point of the dent using a fourth time-of-flight measurement, wherein the width between the starting point of the dent and the ending point of the dent is further calculated based on the third distance, the fourth distance, and a fifth distance between the first infrared camera and the second infrared camera.

9. The automated system of claim 1, wherein the processor is further configured to produce an augmented reality image or video that superimposes dimensional parameters from the three-dimensional model onto an image or video of the portion of the exterior surface of the aircraft.

10. The automated system of claim 1, wherein the processor is further configured to enhance visible image data generated by the visible light camera by using a grayscale conversion to remove discrepancies due to lighting conditions.

11. The automated system of claim 1, wherein the processor is further configured to provide a live image or video from the visible light camera to a mobile device via a network connection.

12. The automated system of claim 1, wherein the processor is further configured to provide the three-dimensional model to a mobile device for rendering via a network connection.

13. The automated system of claim 1, wherein the processor is further configured to provide a damage assessment to a mobile device to assist a crew, an airline, or both in making flight decisions.

14. The automated system of claim 1, further comprising a database, wherein the processor is further configured to provide the three-dimensional model to the database for use in comparisons to future three-dimensional models associated with the portion of the exterior surface, to provide findings related to damage to the exterior surface to the database for documentation, or both.

15. A method comprising:
  moving an autonomous vehicle around an aircraft according to a predetermined path, wherein the autonomous vehicle comprises a vertically extendable arm, wherein a camera module is attached to a distal end of the vertically extendable arm, and wherein the camera module comprises a first infrared camera, a second infrared camera, and a visible light camera;

scanning an exterior surface of the aircraft using the first infrared camera, the second infrared camera, the visible light camera, or a combination thereof;

determining whether a portion of the exterior surface of the aircraft is damaged based on the scan; and in response to the portion of the exterior surface of the aircraft being damaged:

moving the autonomous vehicle to position the first infrared camera and the second infrared camera so that a base line between the first infrared camera and the second infrared camera is parallel with the portion of the exterior surface of the aircraft;

rotating the first infrared camera and the second infrared camera so that the first infrared camera and the second infrared camera are iteratively directed at points running along a dent in the portion of the exterior surface of the aircraft beginning at a starting point on a first side of the dent and ending at an ending point on a second side of the dent;

for each point of the points running along the dent, determining a first angle in azimuth associated with the first infrared camera and a second angle in azimuth associated with the second infrared camera; and calculating distances between the base line and the points running along the dent using the first angle in azimuth and the second angle in azimuth for each point of the points, wherein the distances between the base line and the points running along the dent are used to generate a three-dimensional model of the portion of the exterior surface of the aircraft.

16. The method of claim 15, further comprising:

determining a first distance between the first infrared camera and a starting point of the dent in the portion of the exterior surface of the aircraft using a first time-of-flight measurement;

determining a second distance between the first infrared camera and an ending point of the dent using a second time-of-flight measurement; and calculating a width between the starting point of the dent and the ending point of the dent based, at least in part, on the first distance and the second distance.

17. An apparatus comprising:

a camera module comprising:
    a first infrared camera;
    a second infrared camera; and
    a visible light camera;

an autonomous vehicle comprising a vertically extendable arm, wherein the camera module is attached to a distal end of the vertically extendable arm, wherein the autonomous vehicle is configured to move around an aircraft according to a predetermined path, wherein the camera module is configured to scan of an exterior surface of the aircraft using the first infrared camera, the second infrared camera, the visible light camera, or a combination thereof, wherein, in response to a portion of the exterior surface of the aircraft being damaged, the autonomous vehicle is configured to:

position the first infrared camera and the second infrared camera so that a base line between the first infrared camera and the second infrared camera is parallel with the portion of the exterior surface of the aircraft; and rotate the first infrared camera and the second infrared camera so that the first infrared camera and the second infrared camera are iteratively directed at points running along a dent in the portion of the exterior surface of the aircraft beginning at a starting point on a first side of the dent and ending at an ending point on a second side of the dent; and a processor configured to:

for each point of the points running along the dent, determine a first angle in azimuth associated with the first infrared camera and a second angle in azimuth associated with the second infrared camera; and calculate distances between the base line and the points running along the dent using the first angle in azimuth and the second angle in azimuth for each point of the points, wherein the distances between the base line and the points running along the dent are used to generate a three-dimensional model of the portion of the exterior surface of the aircraft.

18. The apparatus of claim 17, wherein the camera module further comprises a motorized table configured to rotate in both azimuth and elevation, wherein the first infrared camera, the second infrared camera, and the visible light camera are attached to the motorized table, wherein the first infrared camera and the second infrared camera are separated by a fixed distance relative to one another, and wherein scanning of the exterior surface of the aircraft comprises commanding the camera module to scan azimuthally at incremental changes of elevation angles.

19. The apparatus of claim 17, wherein the autonomous vehicle is configured to move around the aircraft based on a stored electronic map, and wherein verification of the movement of the autonomous vehicle is performed using detectable references positioned on a tarmac, a radar, a lidar, a global positioning system, or a combination thereof.

20. The apparatus of claim 17, wherein the autonomous vehicle is configured to use proximity range sensors to avoid obstacles during the movement of the autonomous vehicle around the aircraft.

\* \* \* \* \*